United States Patent [19]

Millsap

[11] Patent Number: 4,650,375

[45] Date of Patent: Mar. 17, 1987

[54] DRILL BRAKING SYSTEM

[75] Inventor: James W. Millsap, 3535 Wicker, Highland, Ind. 46322

[73] Assignees: James W. Millsap; Peter Miller

[21] Appl. No.: 803,493

[22] Filed: Dec. 2, 1985

[51] Int. Cl.⁴ .............................................. B23B 47/20
[52] U.S. Cl. ........................................ 408/6; 318/285; 408/7; 408/9; 409/134
[58] Field of Search ........................... 29/407; 175/50; 318/452, 285, 286, 466; 408/7, 9, 12, 11, 6; 409/134, 186, 187, 193, 194

[56] References Cited

U.S. PATENT DOCUMENTS

| 2,747,154 | 5/1956 | Abrams | 29/407 X |
| 3,008,074 | 11/1961 | Gregory | 318/285 X |
| 3,868,035 | 2/1975 | Broyles | 214/762 |
| 3,871,536 | 3/1975 | Brown | 214/762 X |
| 4,104,571 | 8/1978 | Gurwicz et al. | 318/380 |
| 4,329,771 | 5/1982 | Eto et al. | 29/568 |
| 4,396,322 | 8/1983 | Nomura et al. | 409/134 |

FOREIGN PATENT DOCUMENTS

| 3206354 | 9/1983 | Fed. Rep. of Germany | 408/12 |
| 520678 | 5/1940 | United Kingdom | 318/285 |
| 856680 | 8/1981 | U.S.S.R. | 408/11 |

Primary Examiner—William R. Briggs
Attorney, Agent, or Firm—George H. Gerstman

[57] ABSTRACT

An electric drill safety device is provided for dynamically braking a drill when there is contact between the drill bit and an electrically conductive material. A first direction voltage is applied to the motor winding to turn the motor forward. When contact is detected between the drill bit and an electrically conductive material, voltage to the windings is discontinued momentarily and thereafter a reverse direction voltage is provided to the motor windings for a predetermined time.

17 Claims, 2 Drawing Figures

DRILL BRAKING SYSTEM

BACKGROUND OF THE INVENTION

The present invention concerns a novel device for dynamically braking an electric drill when contact is detected between the drill bit and an electrically conductive material.

When drilling with an electric drill, it is possible for the drill bit to come into contact with an electrically conductive material which may have serious results. For example, persons accidentally drilling into high voltage electric lines have become electrocuted as a result thereof. Further, electric lines have become disabled as a result of being disrupted by a drill bit inadvertently engaging the electric line. Still further, a drill bit that is meant to drill wood or the like may be damaged as a result of contact with metal.

The inadvertent drilling of an electric line may result in a serious discontinuance of the operation of the electric devices coupled to the line, such as computers or even the heating and ventilating systems of a building. The inadvertent drilling of a high voltage line may also create this disengagement of electrical services, in addition to possibly electrocuting the operator.

It is an object of the present invention to provide an electric drill safety device for dynamically braking a drill when there is contact between the drill bit and an electrically conductive material.

A further object of the present invention is to provide an electric drill safety device that significantly alleviates chances of electrocution if the drill bit inadvertently contacts a high voltage electric line.

A further object of the present invention is to provide an electric drill safety device that operates to reverse the motor when there is detection of contact between the drill bit and an electrically conductive material.

Another object of the present invention is to provide an electric drill safety device that is efficient in construction and is simple in operation.

Other objects and advantages of the invention will become apparent as the description proceeds.

SUMMARY OF THE INVENTION

In accordance with the present invention, an electric drill safety device is provided for braking a drill having motor windings and a drill bit. The safety device includes means for applying a first direction voltage to the motor windings to turn the motor forward. Means are provided for detecting contact between the drill bit and an electrically conductive material. Reversing means are provided which are responsive to the detecting means for providing a reverse direction voltage to the motor windings. Timing means are provided for operating the reversing means for a predetermined time.

In the illustrative embodiment, the reversing means include means responsive to the detecting means for discontinuing the voltage prior to providing the reverse direction voltage. The contact detecting means comprise comparator means normally in a first condition but operative when in a second condition to signal the reversing means.

In the illustrative embodiment, the comparator means comprise an operational amplifier having a reference input that normally balances the operational amplifier. Means are provided for unbalancing the operational amplifier when contact is detected between the drill bit and an electrically conductive material.

In the illustrative embodiment, the reversing means comprises control switch means and means for driving the control switch means. The control switch means comprises a first relay and a second relay operative in response to the first relay. The driving means comprises a transistor for actuating the first relay and the timing means comprises a timer control responsive to the second relay. The first relay operates as the means for discontinuing the voltage prior to providing the first direction voltage.

A more detailed explanation of the invention is provided in the following description and claims, and is illustrated in the accompanying drawings.

DETAILED DESCRIPTION OF THE ILLUSTRATIVE EMBODIMENT

Figure 1:
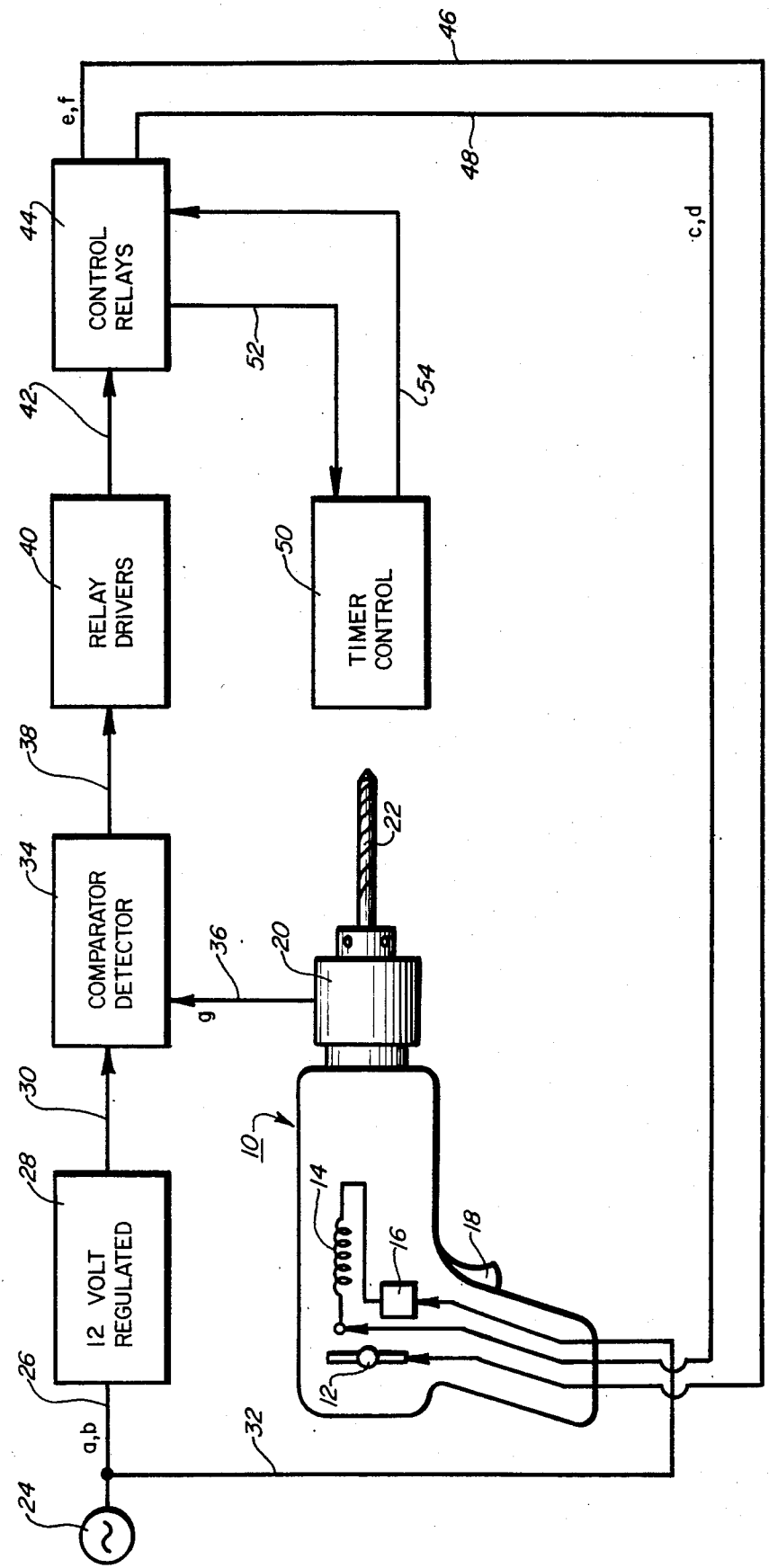
FIG. 1 is a block diagram of an electric drill safety device constructed in accordance with the principles of the present invention.

Referring to FIG. 1, an electric drill 10 is shown therein having armature winding 12, field winding 14, SCR speed control circuit 16, trigger 18 for operating the drill with the speed increasing as the trigger is pulled backward, chuck 20, and drill bit 22. Electric drill 10 may comprise a conventional electric drill, which has been modified only electrically and not mechanically, in the manner to be described.

As illustrated in FIG. 1, a source of voltage 24, preferably a 120 volt alternating current source, is connected via line 26 to a voltage regulation circuit 28 for providing a DC regulated voltage, preferably 12 volts DC, on line 30. The voltage source 24 is also connected via lines 32 to SCR speed control circuit 16.

Line 30 inputs to a comparator/detector circuit 34. An electrically conductive line 36 is connected to the thrust bearing that holds the drill chuck shaft and the line 36 is used for sensing purposes. Line 36 inputs to comparator/detector 24 to unbalance the comparator, as discussed below, when contact between drill bit 22 and an electrically conductive material is sensed.

Comparator/detector 34, when unbalanced, provides a detection output signal via line 38 to relay drivers 40. Relay drivers 40 operate via line 42 to actuate control relays 44. Control relays 44 operate via lines 46 and 48 to effectively reverse the direction of the armature and field windings, respectively, and thus to enable a reverse voltage to be applied to the windings 12, 14 after voltage has been discontinued to the windings momentarily. The control relays 44 also actuate timer control circuit 50 via line 52, and timer control circuit 50 operates via line 54 to provide a predetermined time period for the application of the reverse voltage to windings 12, 14. By discontinuing the voltage momentarily when contact between the drill bit and an electrically conductive material is detected and by thereafter reversing the direction of the voltage to the motor windings for a predetermined time, the drill bit will not enter the electrically conductive material but will instead appear on the operator to stop promptly without creating unnecessary reverse torque.

The electrically conductive material may be an electrical line carrying alternating or direct current, or it may be any metallic or other electrically conductive material at ground potential or any other state or condition.

Figure 2:
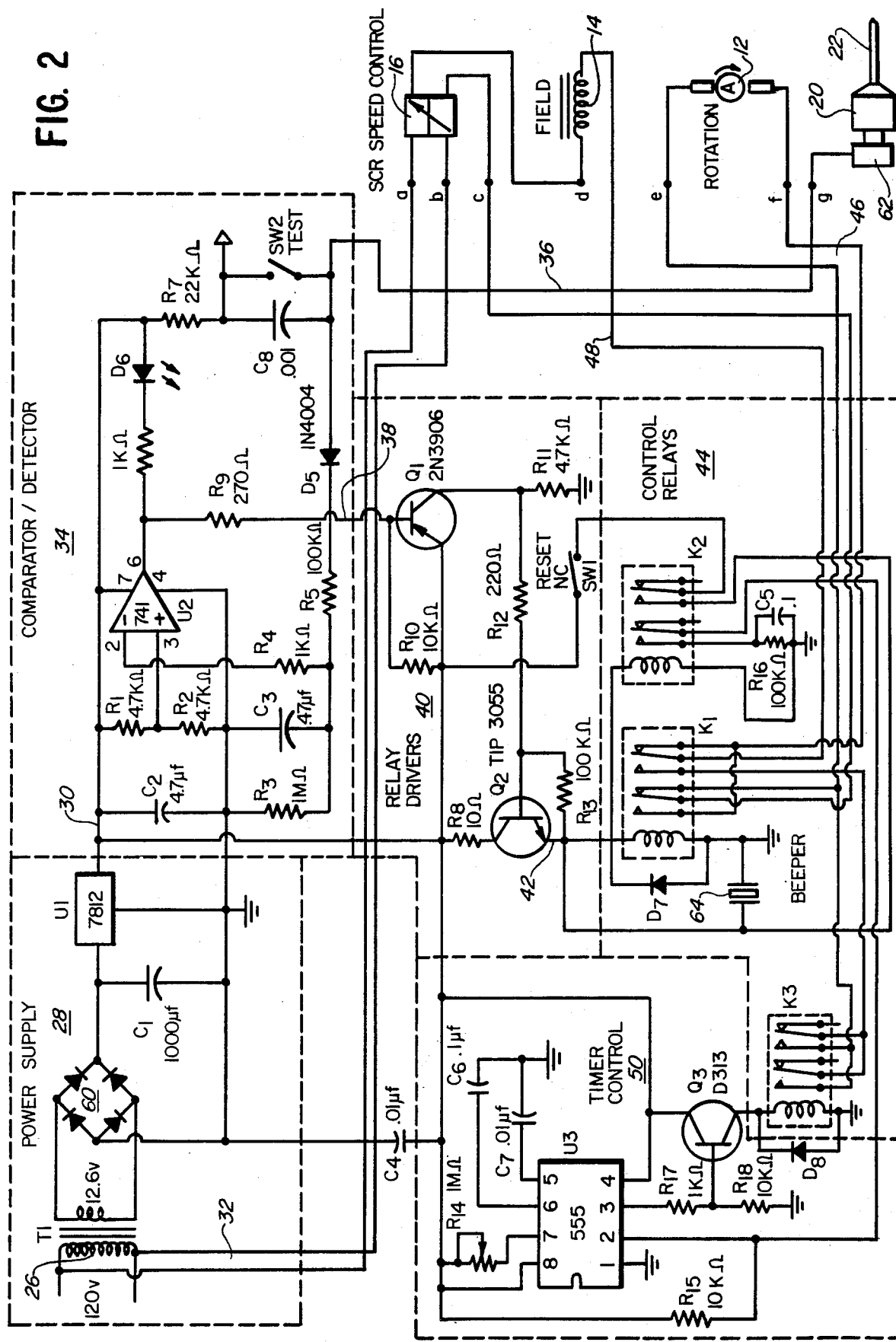
FIG. 2 is a schematic circuit diagram thereof.

A detailed schematic circuit diagram of the system of FIG. 1 is provided in FIG. 2. Referring to FIG. 2, the primary of transformer T1 is connected to a 120 volt AC power supply and the transformer's 12.6 volt secondary feeds a bridge rectifier 60 outputting 16–18 volts unfiltered DC. Capacitor C1 is a smoothing capacitor and U1 is a 7182 voltage regulator which operates the power supply circuit 28 to provide 12 volts of filtered direct current on line 30.

The 12 volt filtered DC is fed to comparator/detector 34 which includes a 741 open loop gain general class operational amplifier U2. A fixed bias is created on input pin 3 of op amp U2 by resistor R1 and R2 and a fixed bias is on input pin 2 of op amp U2 by resistors R3 and R4.

As illustrated on the right-hand side of FIG. 2, an electrically conductive line 36 is connected from the thrust bearing 62 that holds the drill chuck shaft of drill 10, through diode D5 which is a general purpose diode rectifier and through resistor R5 to an input of operational amplifier U2. Upon detecting ground or power, operational amplifier U2 becomes unbalanced between pins 2 and 3, causing a voltage shift on output pin 6 thereby providing a detection output signal via resistor R9 to the base of transistor Q1 via line 38. This signal operates to turn on transistor Q1 which turns on transistor Q2 to activate relays K1 and K2 and also activate an audible warning beeper 64.

When relays K1 and K2 are activated, relay K1 opens the circuits to the motor windings, thereby discontinuing voltage to the drill motor momentarily. At the same time, the motor windings are reversed by relay K1, to prepare for the dynamic braking action to occur via the contacts of relay K3.

Thus relay K1 is used to reverse the drill by reversing the field and armature windings. Relay K2, in parallel therewith, is used exclusively to trigger 555 timer circuit U3. Timer circuit U3 is adjustable by virtue of R14, a variable resistor. When activated, timer U2 energizes transistor Q3 to drive relay K3 for a predetermined time, for example, 100 milliseconds, during which predetermined time reverse voltage is effectively applied to the motor windings. This short duration of reverse voltage being applied to the motor windings achieves the dynamic braking action. To the operator, the drill appears to stop instantly at the moment there is contact between the bit 22 and the electrically conductive material, while in actuality the momentary discontinuance of voltage and short duration of reverse voltage is present to prevent the normal momentum of the drill bit from engaging the electrically conductive material further and also to prevent any feeling by the operator of an uncomfortable twisting action by the drill.

Once the dynamic braking action has occurred, the safety circuit can be reset by means of reset switch SW1. By connecting the SCR speed control circuit 16 as illustrated in FIG. 2, if the drill is operating at a high speed in the forward direction, once there is contact with an electrically conductive material the reverse direction voltage will be commensurate because the reverse direction voltage is also applied under control of the SCR speed control circuit 16.

A test switch SW2 is provided for testing the operation of the electric drill safety circuit. A light-emitting diode D6 is provided to indicate to the operator that operational amplifier U2 has been triggered.

In an actual experiment, a standard Sears Craftsman ⅜ inch reversible drill was electrically modified to include the circuit of FIG. 2, and the system was found to operate in a very satisfactory manner.

Although an illustrative embodiment of the invention has been shown and described, it is to be understood that various modifications and substitutions may be made by those skilled in the art without departing from the novel spirit and scope of the present invention.

What is claimed is:

1. An electric drill safety device for braking a drill having motor windings for driving the motor in a forward and a reverse direction and a drill bit, which comprises:
    means for applying a first direction voltage to the motor windings to turn the motor and the drill bit in a forward direction;
    means for detecting contact between the drill bit and an electrically conductive material; and
    means responsive to said detecting means for discontinuing the first direction voltage and means for automatically providing a reverse direction voltage to the motor windings to thereby brake the driven direction of the motor to prevent the forward rotative momentum of the drill bit from engaging the electrically conductive material further.

2. An electric drill safety device as described in claim 1, including timing means for operating said reverse direction voltage means for a predetermined time.

3. An electric drill safety device as described in claim 1, said means for applying a first direction voltage including means for coupling said windings to a source of alternating current.

4. An electric drill safety device as described in claim 1, said contact detecting means comprising comparator means normally in a first condition but operative when in a second condition to signal said reverse direction voltage means, and means for sensing contact to place said comparator means in said second condition.

5. An electric drill safety device as described in claim 4, said comparator means comprising an operational amplifier having a reference input normally balancing said operational amplifier, and means for unbalancing said operational amplifier when contact is detected between the drill bit and an electrically conductive material.

6. An electric drill safety device as described in claim 1, including audible signal means for indicating contact between the drill bit and an electrically conductive material; means for resetting said reversing means; and means for testing said detecting means.

7. An electric drill safety device as described in claim 1, said reverse direction voltage means comprising control switch means and means for driving said control switch means.

8. An electric drill safety device as described in claim 7, said control switch means comprising a first relay and a second relay operative in response to said first relay.

9. An electric drill safety device as described in claim 8, said driving means comprising a transistor for actuating said first relay.

10. An electric drill safety device as described in claim 8, including timing means for operating said reverse direction voltage means for a predetermined time, said timing means comprising a timer control responsive to said second relay.

11. An electric drill safety device for braking the drill having motor windings for driving the motor in a forward and reverse direction and a drill bit, which comprises:
  means for applying a first direction voltage to the motor windings to turn the motor and the drill bit in a forward direction, said applying means including means for coupling said windings to a source of alternating current;
  means for detecting contact between the drill bit and an electrically conductive material, said contact detecting means comprising comparator means normally in a first condition but operative when in a second condition to provide a contact detection output signal;
  means responsive to said contact detection output signal for discontinuing the first direction voltage and means for automatically providing a reverse direction voltage to the motor windings to thereby brake the driven direction of the motor to prevent the forward rotative momentum of the drill bit from engaging the electrically conductive material further, said reverse direction voltage means comprising control switch means and means for driving said control switch means;
  said means for discontinuing the first direction voltage being operable to discontinue the voltage prior to the reverse direction voltage being provided; and
  timing means for operating said control switch means for a predetermined time.

12. An electric drill safety device as described in claim 11, said comparator means comprising an operational amplifier having a reference input normally balancing said operational amplifier, and means for unbalancing said operational amplifier when contact is detected between the drill bit and an electrically conductive material; said contact switch means comprising a first relay and a second relay operative in response to said first relay; and said timing means comprising a timer control responsive to said second relay.

13. An electric drill safety device as described in claim 12, said means for discontinuing voltage comprising said first relay.

14. An electric drill safety device for braking a drill having motor windings for driving the motor in a forward and a reverse direction, speed control means and a drill bit, which comprises:
  means for applying a first direction voltage to the motor windings to turn the motor and the drill bit in a forward direction;
  means for applying a voltage to said speed control means;
  sensing means connected to a conductive portion of the drill;
  comparator means operatively connected to said sensing means to provide a detection output signal when contact between the drill bit and an electrically conductive material is detected;
  switch driving means operative in response to said detection output signal;
  control switch means driven by said driving means for discontinuing the first direction voltage when said detection output signal is received and means for automatically providing a reverse direction voltage to the motor windings thereafter to thereby brake the driven direction of the motor to prevent the forward rotative momentum of the drill bit from engaging the electrically conductive material further.

15. An electric drill safety device as described in claim 14, including timing means coupled to said control switch means for enabling said reverse direction voltage to be applied to the motor windings for a predetermined time.

16. An electric drill safety device as described in claim 14, said comparator means comprising an operational amplifier having a reference input normally balancing said operational amplifier, and means for unbalancing said operational amplifier when contact is detected between the drill bit and an electrically conductive material.

17. An electric drill safety device as described in claim 14, said reverse direction voltage means comprising control switch means and means for driving said control switch means, said control switch means comprising a first relay and a second relay operative in response to said first relay; and said means for discontinuing voltage comprising said first relay.

* * * * *